(12) United States Patent
Hayes (10) Patent No.: US 6,805,902 B1
(45) Date of Patent: Oct. 19, 2004

(54) PRECISION MICRO-OPTICAL ELEMENTS AND THE METHOD OF MAKING PRECISION MICRO-OPTICAL ELEMENTS

(75) Inventor: Donald J. Hayes, Parker, TX (US)

(73) Assignee: Microfab Technologies, Inc., Plano, TX (US)

( * ) Notice: Subject to any disclaimer, the term of this patent is extended or adjusted under 35 U.S.C. 154(b) by 670 days.

(21) Appl. No.: 09/794,416

(22) Filed: Feb. 27, 2001

Related U.S. Application Data
(60) Provisional application No. 60/185,521, filed on Feb. 28, 2000.

(51) Int. Cl.[7] ................................................. B05D 5/06
(52) U.S. Cl. .................... 427/162; 426/163.2; 426/165; 426/287; 426/309
(58) Field of Search ................................ 427/287, 309, 427/97, 162, 163.2, 165

(56) References Cited

U.S. PATENT DOCUMENTS

| | | |
|---|---|---|
| 2,481,620 A | 9/1949 | Rosenthal |
| 3,476,291 A | 11/1969 | Glaser |
| 3,767,445 A * | 10/1973 | Chandross et al. ......... 427/510 |
| 3,900,034 A | 8/1975 | Katz et al. |
| 4,337,886 A | 7/1982 | King et al. |
| 4,418,354 A | 11/1983 | Perduijn |
| 4,423,120 A | 12/1983 | Paulus et al. |
| 4,460,904 A | 7/1984 | Oszczakiewicz et al. |
| 4,461,294 A | 7/1984 | Baron |
| 4,485,386 A | 11/1984 | Dagna et al. |
| 4,522,903 A | 6/1985 | Heiart et al. |
| 4,527,717 A | 7/1985 | Emoto et al. |
| 4,600,424 A | 7/1986 | Flaming |
| 4,682,187 A | 7/1987 | Martner |
| 4,695,527 A | 9/1987 | Geissler et al. |
| 4,776,868 A | 10/1988 | Trotter, Jr. et al. |
| 4,812,856 A | 3/1989 | Wallace |
| 4,828,886 A | 5/1989 | Hieber |
| 4,832,024 A | 5/1989 | Boussignac et al. |
| 4,853,317 A | 8/1989 | Hayes |
| 4,891,043 A | 1/1990 | Zeimer et al. |
| 5,024,726 A | 6/1991 | Fujiwara |
| 5,053,100 A | 10/1991 | Hayes et al. |
| 5,090,609 A | 2/1992 | Nakao et al. |
| 5,092,864 A | 3/1992 | Hayes et al. |
| 5,193,738 A | 3/1993 | Hayes |
| 5,196,241 A | 3/1993 | Burke et al. |
| 5,208,980 A | 5/1993 | Hayes |
| 5,227,813 A | 7/1993 | Pies et al. |
| 5,229,016 A | 7/1993 | Hayes et al. |
| 5,235,352 A | 8/1993 | Pies et al. |
| 5,324,623 A | 6/1994 | Tsumori |
| 5,345,256 A | 9/1994 | Stortz |
| 5,365,645 A | 11/1994 | Walker et al. |
| 5,373,314 A | 12/1994 | Everett et al. |
| 5,400,064 A | 3/1995 | Pies et al. |
| 5,402,162 A | 3/1995 | Fusting et al. |
| 5,406,319 A | 4/1995 | Hayes et al. |
| 5,414,916 A | 5/1995 | Hayes |
| 5,426,455 A | 6/1995 | Williamson et al. |
| 5,430,470 A | 7/1995 | Stortz |

(List continued on next page.)

*Primary Examiner*—Brian K. Talbot
(74) *Attorney, Agent, or Firm*—Locke Liddell & Sapp LLP (57) ABSTRACT

Micro-optical elements such as lenses and wave-guides are manufactured by printing a hardenable optical fluid using digitally driven ink-jet technology. An array of micro-optical elements are precisely positioned in an electroformed substrate having a surface containing structural openings which serve as molds for micro-droplets of optical fluids deposited from an ink-jet printhead. The structural openings have a stepped down edge, a shelf-like support surface below the edge and a centered aperture in the substrate. The micro-optical element formed is controlled by the shape of the edge in the surface of the substrate and the radius by the volume of micro-droplets deposited into the structural opening. The structural openings can be circular, or any desired shape which is easily and precisely formed in an electroformed substrate.

40 Claims, 7 Drawing Sheets

U.S. PATENT DOCUMENTS

| | | |
|---|---|---|
| 5,433,809 A | 7/1995 | Pies et al. |
| 5,435,060 A | 7/1995 | Hayes et al. |
| 5,436,648 A | 7/1995 | Stortz et al. |
| 5,444,467 A | 8/1995 | Stortz |
| 5,498,444 A | 3/1996 | Hayes |
| 5,534,101 A * | 7/1996 | Keyworth et al. ..... 156/244.12 |
| 5,681,757 A | 10/1997 | Hayes |
| 5,707,684 A * | 1/1998 | Hayes et al. ................. 427/162 |
| 5,723,176 A * | 3/1998 | Keyworth et al. ....... 427/163.2 |
| 5,736,074 A | 4/1998 | Hayes et al. |
| 6,304,384 B1 * | 10/2001 | Nishikawa .................. 359/619 |

* cited by examiner

PRECISION MICRO-OPTICAL ELEMENTS AND THE METHOD OF MAKING PRECISION MICRO-OPTICAL ELEMENTS

CROSS-REFERENCE TO RELATED APPLICATIONS

This application is a continuation-in-part of Provisional Application 60/185,521, filed Feb. 28, 2000 by the same inventor for which priority benefit is claimed.

CROSS-REFERENCE TO RELATED PATENT

This application relates to U.S. Pat. No. 5,498,444, titled "Method for Producing Micro-Optical Components" issued Mar. 12, 1996 to Donald J. Hayes, and U.S. Pat. No. 5,707,684, titled "Method for Producing Micro-Optical Components" issued Jan. 13, 1998 to Donald J. Hayes and W. Royall Cox, both patents being incorporated herein by reference in their entirety.

BACKGROUND OF THE INVENTION

1. Field of the Invention

The present invention relates to a method of making arrays of micro-optical elements precisely located and having specific optical shapes.

2. Background of the Invention

Micro-optical element arrays are primarily used in the optical communication and optical imaging fields. In general, these applications require that the optical elements have several features. They require control over the shape of the individual elements; the elements must be precisely located relative to each other and other optical components; the optical properties of the elements must be precisely controlled; the elements must be alignable with other optical components; and unwanted optical beams must be blocked and optical cross-talk limited.

There are various method s of making micro-optical elements such as molding, photolithography, and MicroJet printing. However, MicroJet printing is particularly advantageous as to the type of micro-optical elements that can be created and it permits accurate placement of elements within arrays.

Unlike the other methods, the present invention meets all the requirements a precision array demands, it: allows for the creation of specific optical shapes, controls precisely the optical element location, forms an aperture to block unwanted light, allows for the alignment of other optical elements such as optical fibers, and it can use a wide range of optical materials for its manufacture.

SUMMARY OF THE INVENTION

This invention provides, for the first time, an inexpensive way of creating micro-optical elements, by utilizing the ink-jet printing method of dispensing optical material for automated, in-situ fabrication of micro-element arrays. The flexibility of this data-driven method also enables variation of the shape of the printed micro-optical element.

The first step in fabricating a micro-optical element by means of inkjet printing comprises providing a substrate. The substrate has a surface with at least one structural opening defined by an edge in the surface leading into a sup port surface. The substrate is preferably an electroform comprising nickel and the structural openings are arranged as an array. The support surface has an aperture through the substrate which is positioned centrally with respect to the edge. The edge is preferably 1 to 5 microns deep so as to define the shape of the micro-optical element. The next step is to provide a digitally-driven printhead containing a hard-enable optical fluid suitable for serving as a micro-optical element, preferably an ultraviolet (UV) light-curable epoxy, ejected in response to control signals. Micro-droplets of the optical fluid are deposited into the structural opening of the substrate, preferably centrally over the aperture but if the diameter of the micro-droplets is smaller than the aperture diameter, deposition is preferable over the support surface of the structural opening. In a preferred embodiment, the printhead moves over the surface of the substrate to deposit the optical fluid. The structural opening is then filled until a desired micro-optical element is formed where the element may have a radiused upper or lower surfaces, preferably both. The last step of the process is the hardening of the element, such as by UV light when UV light-curable epoxy is used in a preferred embodiment. Other means for curing such as by heat are also contemplated.

In a preferred embodiment, the production of an array of micro-optical lens elements is described. The first step in fabricating a micro-optical element by means of ink-jet printing comprises providing a substrate. The substrate has a surface with at least one circular structural opening defined by an edge in the surface leading into a support surface. The substrate is preferably an electroform comprising nickel and the structural openings are arranged as an array. The support surface has a circular aperture through the substrate which is positioned centrally with respect to the edge. The edge is preferably 1 to 5 microns deep so as to define and control the shape of the micro-optical element. The next step is to provide a digitally-driven printhead containing a hardenable optical fluid suitable for serving as a micro-optical element, preferably an ultraviolet (UV) light-curable epoxy, ejected in response to control signals. Micro-droplets of the optical fluid are deposited into the structural opening of the substrate. In a preferred embodiment, the printhead moves over the surface of the substrate to deposit the optical fluid. The circular structural opening is then filled until a desired micro-optical element profile is formed where the element may have a radiused upper or lower surface, preferably both. The last step of the process is the hardening of the element.

In another embodiment, the production of an array of elongated micro-optical elements in the form of waveguides is described. The first step in fabricating a micro-optical element by means of ink-jet printing comprises providing a substrate. The substrate has a surface with at least one elongated structural opening defined by an edge in the surface leading into a support surface. The substrate is preferably an electroform comprising nickel and the elongated structural openings are arranged as an array. The support surface has an aperture through the substrate which is positioned centrally with respect to the edge. The edge is preferably 1 to 5 microns deep so as to define the shape of the micro-optical element. The next step is to provide a digitally-driven printhead containing a hardenable optical fluid suitable for serving as a micro-optical element, preferably an ultraviolet (UV) light-curable epoxy, ejected in response to control signals. In a preferred embodiment, the printhead moves over the surface of the substrate to deposit the optical fluid. Micro-droplets of the optical fluid are deposited into the structural opening of the substrate, preferably centrally over the elongated aperture but if the diameter of the micro-droplets is smaller than the aperture diameter, deposition is preferable over the support surface of the structural opening. The elongated structural opening is then filled until a desired micro-optical element is formed where the element may have a radiused upper or lower surfaces, preferably both. The last step of the process is the hardening of the element, such as by UV light when UV light-curable epoxy is used in a preferred embodiment. Other means for curing such as by heat is also contemplated.

BRIEF DESCRIPTION OF THE DRAWINGS

Other advantages and features of the invention will become more apparent with reference to the following detailed description of presently preferred embodiments thereof in connection with the accompanying drawings, wherein like reference numerals haven been applied to like elements, in which:

FIG. 1b is a side-view of the array on lines 1b—1b in FIG. 1a.

DETAILED DESCRIPTION OF THE INVENTION

Figure 1A:
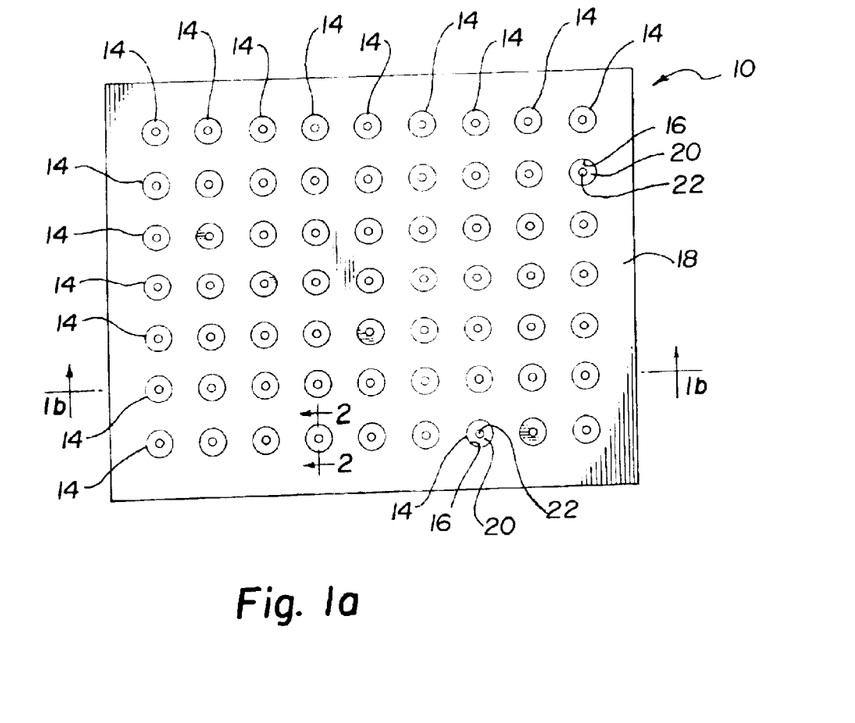
FIG. 1a is a schematic plan view showing an array of circular structural openings for producing an array of micro-optical elements according to the method of the present invention.
Figure 1B:
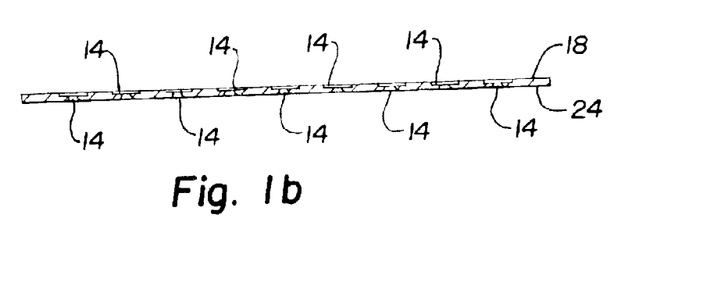
Figure 2:
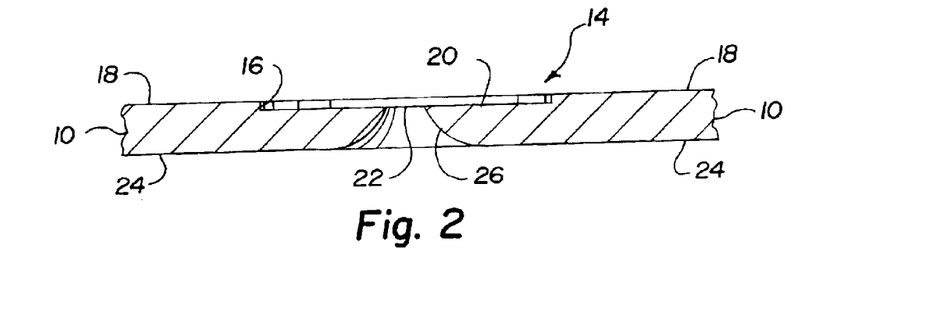
FIG. 2 is a cross-sectional view of a structural opening from the array of FIG. 1a on the line 2—2 showing the relative proportions between the structural opening, support surface, edge, and the taper of the aperture of the substrate in an embodiment of the present invention.

The present invention applies ink-jet printing technology to the fabrication of arrays of micro-optical elements for optical fibers. Shown in FIG. 1a is a substrate 10 with an array of structural openings 14 used to make precision micro-optical elements. Although the structural openings of FIGS. 1a and 1b are circular, they represent only one embodiment of the present invention. Each structural opening 14 is defined by an edge 16 in the upper surface 18 of substrate 10. Edge 16 leads into support surface 20 wherein an aperture 22 is positioned centrally with respect to the edge 16. Edge 16 of structural opening 14 preferably has a depth of about 1 to about 5 microns. FIG. 1b is an endview of substrate 10 that illustrates the thin profile between upper surface 18 and lower surface 24 of the substrate. A magnified representation of single structural opening 14 of array 12 is shown in FIG. 2 before filling with optical material, which also reflects the tapered bottom surface 26 of the circular structural opening embodiment to be discussed below. The aperture being positioned centrally with respect to the edge means that the edge of the aperture opening is generally the same distance from the edge of the structural opening, i.e., the aperture is centered.

Substrate 10 is preferably an electroform plate, preferably made of nickel although any suitable material is appropriate. The electroform process itself is well known and will be described later. Structural openings 14 function as a mold in the fabrication of the micro-optical element and as an attachment point for a micro-optical element and an optical fiber.

Figure 3:
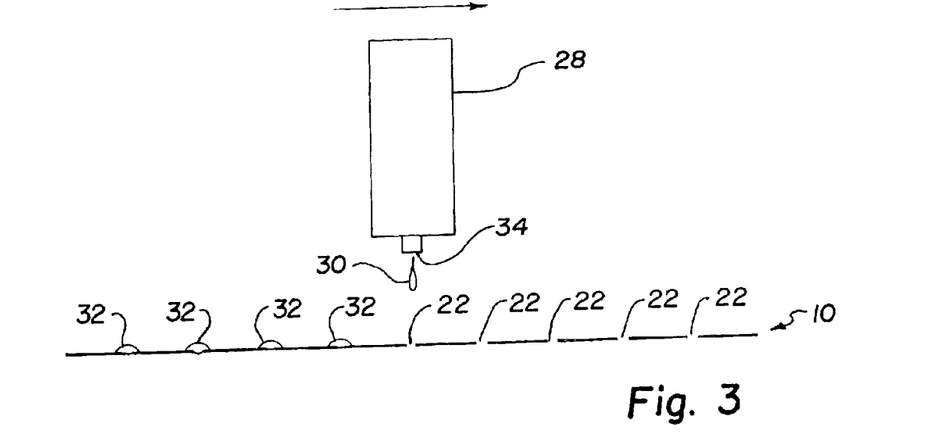
FIG. 3 is a schematic side-view showing the relative position of the printhead relative to the substrate as it deposits micro-droplets of optical material into the structural openings according to the method of the present invention.

FIG. 3 shows a digitally-driven printhead 28 depositing a predetermined size and number of micro-droplets 30 of optical fluid into structural openings 14 to form micro-optical elements 32. Apertures 22 of unfilled structural openings 14 are seen with printhead 28 moving in the direction of the arrow to fill them. Methods of operating an ink-jet printhead to deposit optical polymeric materials in a fluid state are disclosed in U.S. Pat. Nos. 5,498,444 and 5,707,684 entitled Method for Producing Micro-Optical Components by the assignee hereof, the disclosures of which are incorporated by reference. Digitally-driven printhead 28 ejects micro-droplets 30 of optical fluid through orifice 34. The diameter of orifice 34 is preferably between about 20 μm to about 120 μm although smaller or larger orifice diameters are acceptable. The printhead preferably includes a piezoelectric device operable in a drop-in-demand mode and is heatable to control the viscosity of the optical fluid. The movement of the printhead and substrate relative to each other is computer-controlled. The substrate is positioned on a computer-controlled stage movable in the X–Y plane. The computer moves the stage so that a structural opening is positioned to receive optical fluid micro-droplets 30 deposited by the digitally-driven printhead. Ejection of micro-droplets by the printhead is preferably controlled by the same computer. After filling one structural opening, the computer moves the substrate to position the next structural opening under the ejection orifice then activates the printhead to eject the micro-droplets into the structural opening. The stage is again repositioned so the next structural opening is positioned to receive micro-droplets deposited by the digitally-driven printhead and the printhead is again activated to deposit micro-droplets of optical fluid until micro-lenses are formed in each structural opening.

The optical fluid can be any material, or combination of materials, capable of forming a relatively transparent micro-optical element after hardening. Optical epoxies are an example. Some specific commercial materials which have been suitable for forming micro-optical elements include Summers Optical SK9 (Refractive Index 1.49) by Summers Optical, Inc., P.O. Box 162, Fort Washington, Pa. 19034; Norland No. NOA-73 (Refractive Index 1.56) by Norland Products, Inc., P.O. Box 7145, New Brunswick, N.J. 08902); and Epotek No. OG-146 (Refractive Index 1.48) by Epogy Technology, Inc., 14 Fortune Drive, Billerica, Mass. 01821. In a preferred embodiment of the invention, an ultraviolet (UV) light-curable epoxy is used. When used, the diameter of the optical epoxy micro-droplets is preferably within the range of about 8 μm to about 300 μm. Most typically the micro-droplets would be around 50 microns.

Figure 4:
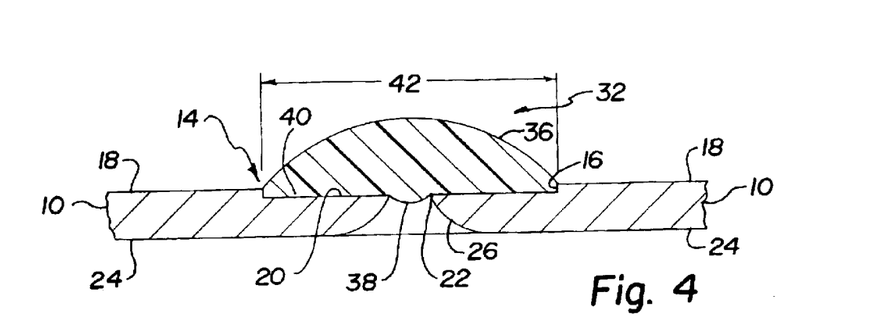
FIG. 4 is a cross-sectional view showing a micro-optical element formed in the structural openings of FIG. 3 after optical material was deposited and the structural opening filled according to a preferred embodiment of the method of the present invention.

In a preferred embodiment a micro-optical lenslet element 32 formed in FIG. 3 is shown in FIG. 4 situated in structural opening 14 of substrate 10 wherein the structural opening is circular. Micro-optical element 32 has a first radiused outer surface 36 formed, in the shape of a hemisphere or a section of a sphere, above support surface 20. A pedestal portion 40 or step-down 40 coincides with the height of edge 16 above support surface 20. A second radiused surface 38 in the shape of a hemisphere or a section of a sphere is formed below support surface 20. Bottom surface 24 slopes upward toward upper surface 18 to form a tapered wall portion 26 at aperture 22. The tapered wall 26 is formed naturally in the process of making the electroformed substrate 10.

Figure 10:
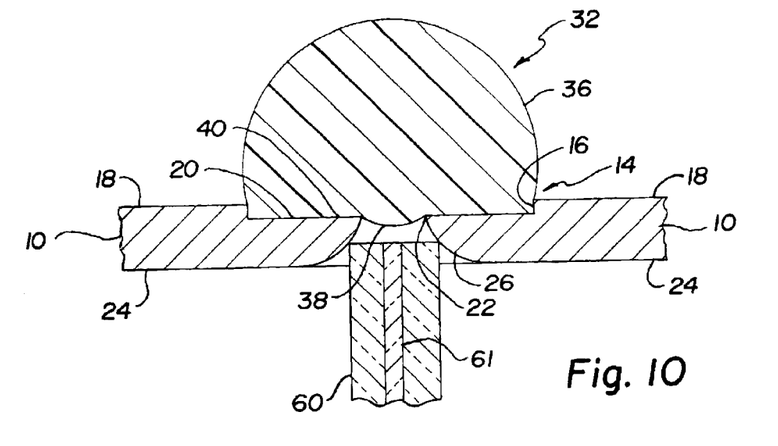
FIG. 10 is a cross-sectional view showing the positioning of an optical fiber under the lower surface of the substrate in line with the aperture of the structural opening.

As shown in FIG. 10, taper 26 can be used to center an optical fiber 60 at the bottom surface 24 of the substrate 10 under aperture 22 of a micro-lens 32. The axis of the core 61 of optical fiber 60 is centered with respect to the central axis of lens 32. Edge 16 and support surface 20 control the shape of the micro-optical material upon filling the structural opening 14 and edge 16 centers the material over aperture 22. Micro-optical element 32 typically has a diameter which coincides with the diameter of structural opening 14. Here the diameter is slightly greater because the micro-optical element 32 is spherical and higher than the hemispherical plane. The process produces lenses with spherical outer surfaces when the structural openings are circular.

In one aspect of the present invention best seen in FIG. 4, a number of micro-droplets 30 of micro-optical element lens material was deposited so that a micro-optical element 32 forms a first radiused surface 36 above support surface 20 and, in another embodiment, a second radiused surface 38 is formed below support surface 20. However, it is to be understood that a micro-optical element lacking both or either a first-radiused surface or second-radiused surface could be formed according to the present invention. The radius of the lenslet being formed is controlled by varying the size or number of droplets of optical material that are deposited. The structural discontinuity at the edge 16 controls the shape (diameter) of the lens that is formed.

Figure 5:
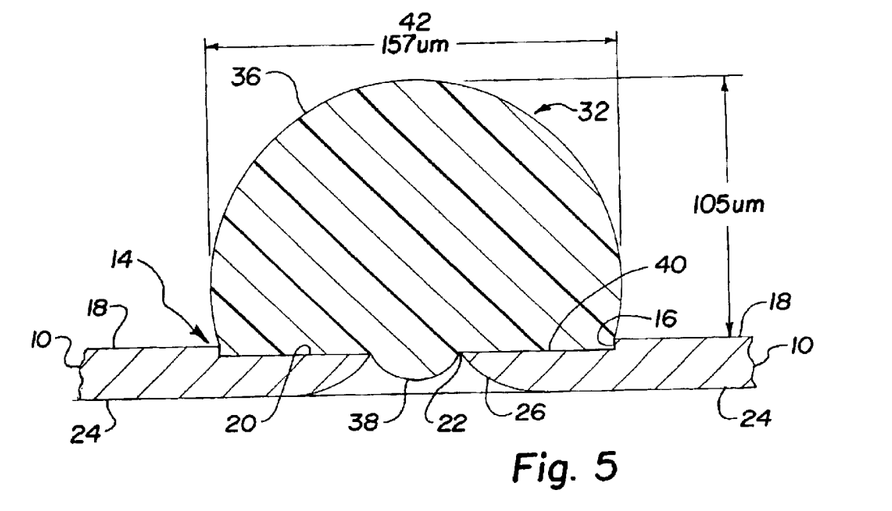
FIG. 5 is a cross-sectional view showing another micro-optical element of a different radius formed in a structural opening after optical material was deposited and the structural opening filled according to a preferred embodiment of the present invention.

The role of edge 16 in forming a first radiused surface 36 and in centering micro-optical element 32 over aperture 22 is shown in FIG. 5 which reflects actual data. In FIG. 5, even though lens 32 was made larger than lens 32 in FIG. 4, it was still controlled by the edge discontinuity from spreading out uncontrollably over the surface 18. The lenslet formed in FIG. 5 was made from an optical epoxy jetted from a digitally driven printhead at about 55° C. from fluid having a viscosity of 6 to 10 centipoise. The orifice in the electroform sheet was about 45 microns. The substrate in this case was held at room temperature. The circular structural openings can be closely and precisely spaced to result in formed micro-optical lens elements also being closely and precisely spaced.

Figure 9:
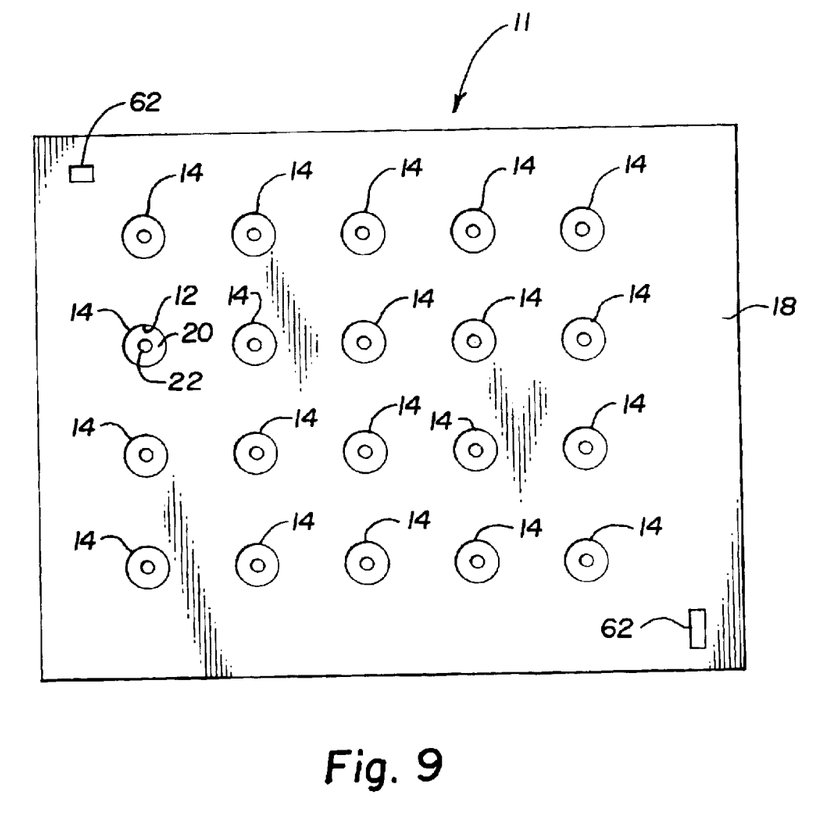
FIG. 9 is a schematic drawing of a substrate like FIG. 1a with alignment features.

FIG. 9 shows a substrate 11 with alignment holes 62. Alignment holes 62 permit precise location of the structural openings and precise alignment of the array relative to the printhead 28 in FIG. 3 when forming the lenslets 32. Moreover, alignment holes 62 allow for accurate positioning of the micro-optical element array 12 relative to other optical components.

Figure 6:
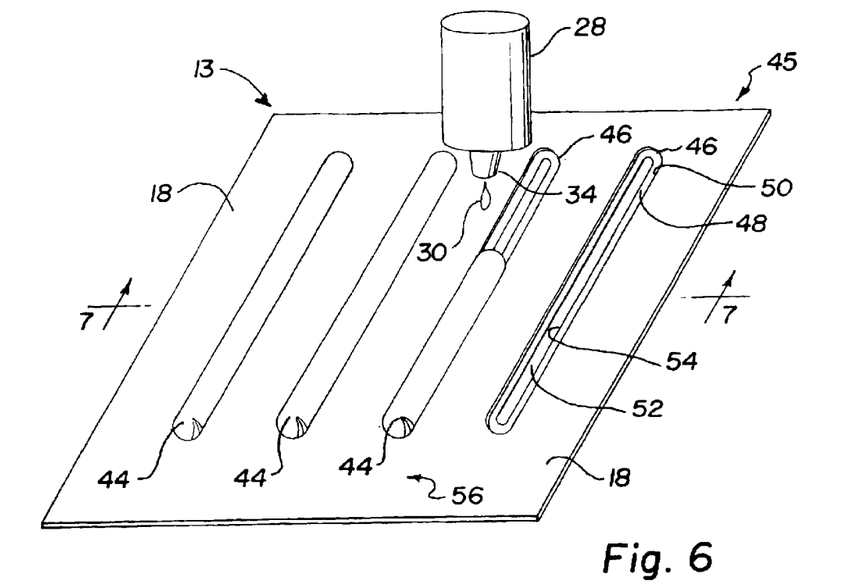
FIG. 6 is a schematic perspective side-view showing the placement of the printhead relative to an array of openings of a preferred embodiment of the present invention as it deposits micro-droplets of a optical material into an elongated structural opening.

Another embodiment of the present invention is shown in FIG. 6. Elongated structural opening 46 is defined by edge 50 in upper surface 18 of substrate 13 leading into support surface 48. Support surface 48 has an aperture 52 extending through the substrate and positioned centrally with respect to edge 50 and support surface 48. Elongated structural opening 46 provides a method of making micro-optical elements such as waveguides of various configurations. Although the structural openings are shown as linear, they could also be curved for special applications. Substrate 13 is an electroform plate, preferably made of nickel although any suitable material is appropriate. The process of making the electroform substrate 13 is the same as for substrate 10, except for the shape of the openings. Structural openings 46 function as a mold in the fabrication of the micro-optical lens element. The micro-optical element material 30 in FIG. 6 is ejected from digitally-driven printhead 28 and deposited in elongated structural openings 46 to form elongated micro-optical waveguide elements 44. The elongated structural openings 46 in FIG. 6 are precisely distanced from one another. The micro-optical waveguide elements 44 are therefore also precisely distanced from each other as shown.

Figure 7:
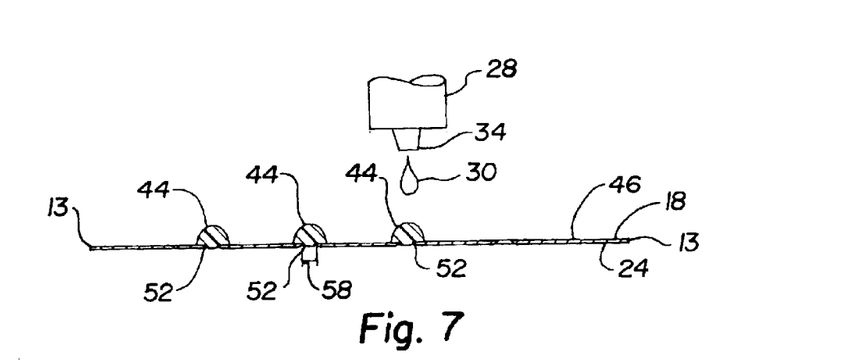
FIG. 7 is a side view on lines 7—7 in FIG. 6 of the array of the embodiment showing placement of the printhead relative to an array of openings of the preferred embodiment of the present invention shown in FIG. 6.

FIG. 7 shows a cross-section through substrate 13 of FIG. 6 reflecting the position of digitally-driven printhead 28 over an elongated structural opening 46 as droplets 30 are being ejected to form waveguides 44. Digitally-driven printhead 28 can be positioned directly over aperture 52 when the diameter of micro-droplets 30 is greater than the diameter 58 of aperture 52.

Figure 8A:
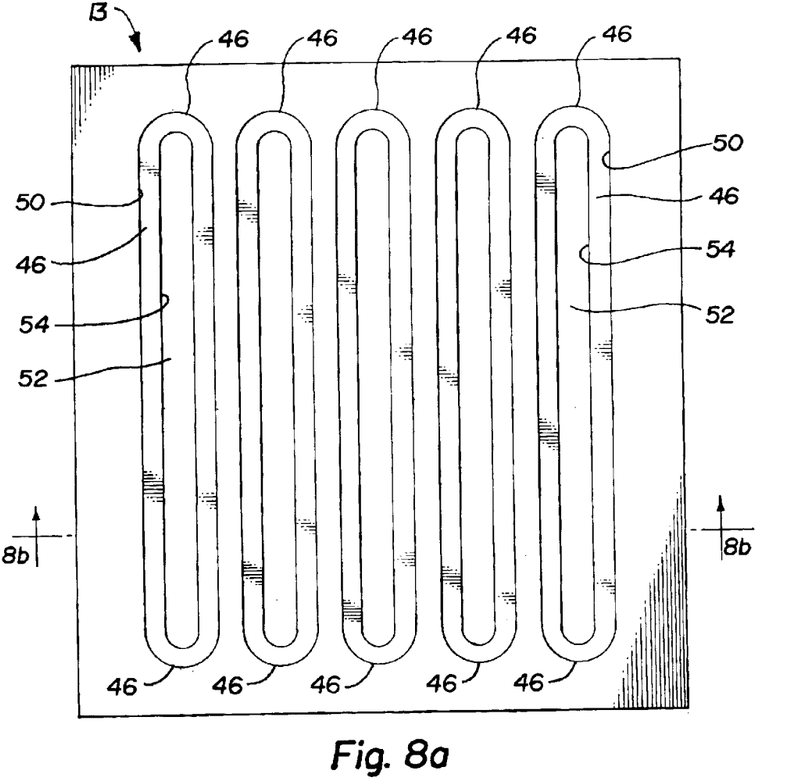
FIG. 8a is a plan view of an array of elongated structural openings according to a preferred embodiment of the present invention showing a close regular arrangement of structural openings.

FIG. 8a shows an array of elongated structural openings 46 before filling with optical material. Thanks to the electroform process, elongated structural openings 46 can be positioned closely to each other in the array. The depth of structural openings 46 and edge 50 are preferably between about 1 μm to about 5 μm.

Figure 8B:
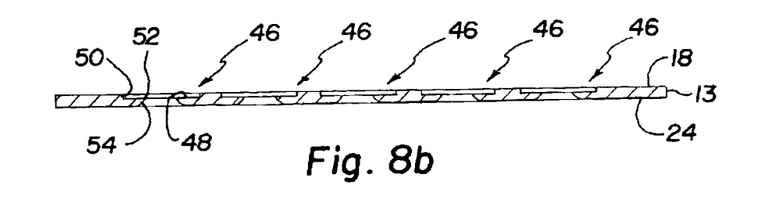
FIG. 8b is a cross-sectional view of FIG. 8a on the lines 8b—8b showing the arrangement of structural openings, support surface, edge, and aperture of the substrate.

FIG. 8b shows the positioning of the array of elongated structural openings 46 in cross-section. Although FIGS. 6 through 8a illustrate micro-optical elements of uniform cross-sectional profile, the elements can be of varying cross-section as well. Since the electroform is essentially made by a photolithographic process, the structural openings can be varied in shape and size and reproduced exactly.

Figure 11A:
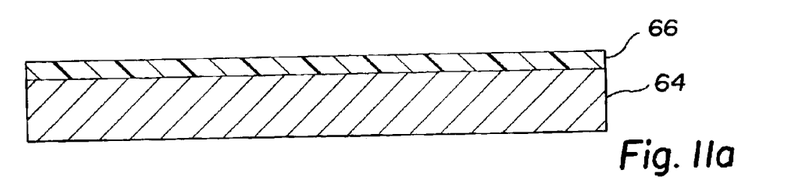
FIG. 11a is a schematic side-view of a mandrel coated with a layer of photoresist.
Figure 11B:
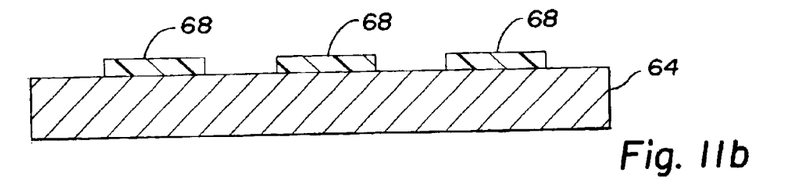
FIG. 11b is a schematic side-view of the mandrel of FIG. 11a after further process to produce photoresist patterns.
Figure 11C:
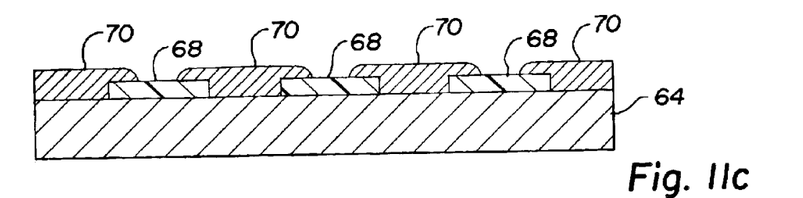
FIG. 11c is a schematic side-view of the mandrel of FIG. 11b with the photoresist patterns surrounded as shown with a suitable electroform material to form an electroform sheet which can be used in the process of the invention.

FIGS. 1a–11c illustrate one form of the electroform process to create an electroform tuba product used as the substrate 10,13 in the present invention. FIG. 11a shows a flat metal mandrel 64 coated with a layer of photoresist 66. The photoresist layer is typically between from about 0.5 microns to about 5 microns thick. The photoresist layer is patterned with standard photolithography processes which are common in the semiconductor industry. After patterning and further processing, patterns 68 are left on the surface as shown in FIG. 11b. Mandrel 64 is used as one of the electrodes in a plating process. A suitable metal, preferably nickel, is plated onto mandrel 64 and extends over the photoresist patterns 68 as shown in FIG. 11c. Electroform plate 70 is peeled off the mandrel and photoresist layer 66 is then chemically removed. Although electroform products are described for use as substrates 10 and 13, other substrate manufacturing methods such as chemical etching or stamping could also be employed.

Although the invention has been disclosed above with regard to a particular and preferred embodiment, it is not intended to limit the scope of the invention. For instance, although the inventive method has been set forth in a prescribed sequence of steps, it is understood that the disclosed sequence of steps may be varied. It will be appreciated that various modifications, alternatives, variations, etc., may be made without departing from the spirit and scope of the invention as defined in the appended claims.

I claim:

1. Method of forming micro-optical elements comprising:
    providing a substrate having a surface with at least one structural opening defined by an edge extending below the surface of the substrate and leading into a support surface, wherein the support surface has an aperture through the substrate positioned centrally with respect to the edge;
    providing a digitally-driven printhead containing an optical fluid, the printhead having an orifice from which micro-droplets of said fluid are ejected in response to control signals;
    depositing a plurality of micro-droplets of said optical fluid into said structural opening;
    filling the structural opening with micro-droplets of said optical fluid deposited from said printhead until a micro-optical element is formed in the structural opening, such that a portion of the micro-optical element extends above the surface of the substrate and the portion extending above the surface of the substrate is formed by the edge; and
    hardening the micro-optical element.

2. The method of claim 1 wherein the step of providing a substrate with at least one structural opening further comprises the step of providing the substrate as an electroform substrate having an array of structural openings and the steps of depositing a plurality of micro-droplets into the structural opening and filling the structural opening are replicated in each structural opening of the array to form an array of micro-optical elements.

3. The method of claim 2 wherein the step of providing an array of structural openings including the step of forming the array of structural openings in the electroform substrate precisely distanced from each adjacent structural opening using semiconductor lithographic techniques.

4. The method of claim 3 wherein the steps of depositing and filling the structural openings further comprises the steps of depositing and filling so that each micro-optical element is centered over the aperture precisely distanced from each adjacent micro-optical element.

5. The method of claim 2 wherein the step of providing an electroform substrate is performed by providing an electroform substrate comprising nickel.

6. The method of claim 1 wherein the step of providing a substrate having a surface with at least one structural opening defined by an edge extending below the surface of the substrate wherein the support surface has an aperture through the substrate positioned centrally with respect to the edge, further comprises the step of providing the edge of the structural opening having a depth of about 1 to about 5 microns below the surface of the substrate.

7. The method of claim 1 wherein the step of filling the structural opening with micro-droplets of said optical fluid deposited from said printhead until a micro-optical element is formed in the structural opening, further comprises the step of forming the micro-optical element with a first radiused surface extending above the support surface.

8. The method of claim 7 wherein the step of filling the structural opening with micro-droplets of said optical fluid deposited from said printhead until a micro-optical element is formed in the structural opening, further comprises the step of forming the micro-optical element with a second radiused surface extending below the support surface.

9. The method of claim 7 wherein the step of depositing a plurality of micro-droplets of said optical fluid into said structural opening further comprises the step of depositing the micro-droplets centrally over the aperture.

10. The method of claim 7 wherein the step of depositing a plurality of micro-droplets of said optical fluid into said structural opening further comprises the step of depositing the micro-droplets along the support surface if the diameter of the micro-droplets is smaller than the diameter of the aperture.

11. The method of claim 1 wherein the step of providing a digitally-driven printhead further comprises the step of providing a piezoelectric device in said printhead operable in a drop-on-demand mode.

12. The method of claim 2 wherein the step of providing a digitally-driven printhead further comprises the step of providing a positioning stage wherein the printhead is movable relative to the substrate so that the micro-droplets of optical fluid can be printed into each of the array of structural openings.

13. The method of claim 1 wherein the step of providing a digitally-driven printhead having an orifice from which micro-droplets of the optical fluid are ejected further comprises the step of providing the orifice with a diameter between about 20 to about 120 $\mu$m.

14. The method of claim 13 wherein the step of providing a digitally-driven printhead further comprises the step of providing a heated digitally-driven printhead and the step of depositing a plurality of micro-droplets includes the step of adjusting the temperature of the heated printhead to control the viscosity of the deposited micro-droplets.

15. The method of claim 13 wherein the step of providing a digitally-driven printhead comprises the step of providing a digitally-driven printhead containing an optical epoxy and the step of depositing a plurality of micro-droplets comprises depositing micro-droplets of said optical epoxy having a diameter of about 8 $\mu$m to about 300 $\mu$m.

16. The method of claim 15 wherein the step of providing a digitally-driven printhead further comprises the step of providing an optical epoxy hardenable by ultraviolet light.

17. Method of forming micro-optical elements comprising:
    providing a substrate having a surface with at least one structural opening defined by an edge extending below the surface of the substrate and leading into a support surface, wherein the support surface has an aperture through the substrate positioned centrally with respect to the edge, wherein both the structural opening and the support surface aperture are circular to form a circular structural opening and a circular aperture.
    providing a digitally-driven printhead containing an optical fluid the printhead having an orifice from which micro-droplets of said fluid are ejected in response to control signals;
    depositing a plurality of micro-droplets of said optical fluid into said circular structural opening;
    filling the circular structural opening with micro-droplets of said optical fluid deposited from said printhead until a micro-optical element is formed in the circular structural opening, such that a portion of the micro-optical element extends above the surface of the substrate and the portion extending above the surface of the substrate is formed by the edge; and hardening the micro-optical element.

18. The method of claim 17 wherein the step of providing a substrate with at least one circular structural opening further comprises the step of providing an electroform substrate having an array of circular structural openings and the step of filling the circular structural opening comprises the step of filling each structural opening in the array of structural openings to form an array of micro-optical elements controlled by the edge.

19. The method of claim 17 wherein the step of providing a substrate having a surface with at least one circular structural opening defined by an edge extending below the surface of the substrate, wherein the support surface has an aperture through the substrate positioned centrally with respect to the edge, further comprises the step of providing the edge of the circular structural opening having a depth about 1 to about 5 microns below the surface of the substrate.

20. The method of claim 18 wherein the step of filling the circular structural opening with micro-droplets of said optical fluid deposited from said printhead until a micro-optical is formed in the circular structural opening, further comprises the step of forming the micro-optical element with a first radiused surface extending above the support surface.

21. The method of claim 20 wherein the step of filling the circular structural opening with micro-droplets of said optical fluid deposited from said printhead until a micro-optical element is formed in the circular structural opening, further comprises the step of forming the micro-optical element with a second radiused surface extending below the support surface.

22. The method of claim 17 wherein the step of providing a substrate having a surface with at least one circular structural opening defined by an edge extending below the surface of the substrate further comprises the step of providing said substrate wherein the support surface has a bottom side and said bottom side tapers toward said aperture.

23. The method of claim 22 further including the step of positioning the end of an optical fiber directly under the aperture with the aid of the tapered bottom side of the substrate.

24. The method of claim 18 wherein the step of providing a digitally-driven printhead further comprises the step of providing a positioning stage wherein the printhead is movable relative to the substrate so that the micro-droplets of optical fluid can be printed into each of the array of circular structural openings.

25. The method of claim 18 wherein the step of providing a digitally-driven printhead having an orifice from which micro-droplets of the optical fluid are ejected further comprises the step of providing the orifice with a diameter between about 20 to about 120 $\mu$m.

26. The method of claim 25 wherein the step of providing a digitally-driven printhead further comprises the step of providing a heated digitally-driven printhead and the step of depositing a plurality of micro-droplets includes the step of adjusting the temperature of the heated printhead to control the viscosity of the deposited micro-droplets.

27. The method of claim 26 wherein the step of providing a digitally-driven printhead comprises the step of providing a digitally-driven printhead containing an optical epoxy and the step of depositing a plurality of micro-droplets comprises depositing micro-droplets of said optical epoxy having a diameter of about 8 $\mu$m to about 300 $\mu$m.

28. The method of claim 27 wherein the step of providing a digitally-driven printhead further comprises the step of providing an optical epoxy hardenable by ultraviolet light and the step of hardening the micro-optical element comprises the step of hardening using ultraviolet light.

29. Method of forming micro-optical elements comprising:

providing a substrate having a surface with at least one structural opening defined by an edge extending below the surface of the substrate and leading into a support surface, wherein the support surface has an aperture through the substrate positioned centrally with respect to the edge, wherein both the structural opening and the aperture of the support surface are elongated to form an elongated structural opening and an elongated aperture.

providing a digitally-driven printhead containing an optical fluid, the printhead having an orifice from which micro-droplets of said fluid are ejected in response to control signals;

depositing a plurality of micro-droplets of said optical fluid into said structural opening;

filling the elongated structural opening with micro-droplets of said optical fluid deposited from said printhead until a micro-optical element is formed in the elongated structural opening, such that a portion of the micro-optical element extends above the surface of the substrate and the portion extending above the surface of the substrate is formed by the edge; and hardening the micro-optical element.

30. The method of claim 29 wherein the step of providing a substrate with at least one elongated structural opening further comprises the step of providing an electroform substrate having an array of elongated structural openings and the step of filling the elongated structural opening further comprises the step of filling each structural opening of the array to form an array of micro-optical elements.

31. The method of claim 30 wherein the step of providing an array of elongated structural openings further comprises the step of forming the elongated structural openings in the electroform substrate precisely distanced from each adjacent elongated structural opening using semiconductor lithographic techniques and the step of forming the array of micro-optical elements forms an array of micro-optical elements precisely distanced from each adjacent micro-optical element.

32. The method of claim 31 wherein the step of providing an electroform substrate having a surface with at least one elongated structural opening defined by an edge extending below the surface of the substrate, wherein the support surface has an aperture through the substrate positioned centrally with respect to the edge, further comprises the step of providing the edge of the elongated structural opening having a depth about 1 to about 5 microns below the surface of the substrate.

33. The method of claim 32 wherein the step of filling the elongated structural opening with micro-droplets of said optical fluid deposited from said printhead until a micro-optical element is formed in the elongated structural opening, further comprising the step of filling the elongated structural opening so that the micro-optical element has a first radiused surface extending above the support surface.

34. The method of claim 33 wherein the step of filling the elongated structural opening with micro-droplets of said optical fluid deposited from said printhead until a micro-optical element is formed in the elongated structural opening, further comprising the step of filling the elongated structural opening so that the micro-optical element has a second radiused surface extending below the support surface.

35. The method of claim 29 wherein the step of providing a digitally-driven printhead further comprises the step of providing a positioning stage wherein the printhead is movable relative to the substrate so that micro-droplets of optical fluid can be printed into each elongated structural opening of the array.

36. The method of claim 35 wherein the step of providing a digitally-driven printhead having an orifice from which micro-droplets of the optical fluid are ejected further comprises the step of providing a digitally-driven printhead containing a piezoelectric device operable in drop-in-demand mode having an orifice with a diameter between about 20 to about 120 $\mu$m.

37. The method of claim 29 wherein the step of providing a printhead containing an optical fluid further comprises the step of providing a heated printhead and the step of depositing a plurality of micro-droplets includes the step of adjusting the temperature of the heated printhead to control the viscosity of the deposited micro-droplets.

38. The method of claim 37 wherein the step of providing a printhead comprises the step of providing a printhead containing an optical epoxy and the step of depositing a plurality of micro-droplets comprises the step of depositing micro-droplets of said optical epoxy.

39. The method of claim 38 wherein the step of providing a printhead containing an optical epoxy further comprises the step of providing an optical epoxy hardenable by ultraviolet light.

40. The method of claim 33 wherein the step of depositing a plurality of micro-droplets of the optical fluid into said elongated structural opening further comprises the step of depositing micro-droplets having a diameter of about 8 $\mu$m to about 300 $\mu$m.

* * * * *